(No Model.)

P. T. WALTON.
CUTTING APPARATUS FOR MOWING AND HARVESTING MACHINERY.

No. 504,641. Patented Sept. 5, 1893.

Witnesses.
Arthur Johnson
Lewis W. Gill

Inventor.
Pierson T. Walton
By his Atty
J. F. Steward

UNITED STATES PATENT OFFICE.

PIERSON T. WALTON, OF SUTTON, NEBRASKA.

CUTTING APPARATUS FOR MOWING AND HARVESTING MACHINERY.

SPECIFICATION forming part of Letters Patent No. 504,641, dated September 5, 1893.

Application filed March 25, 1893. Serial No. 467,591. (No model.)

*To all whom it may concern:*

Be it known that I, PIERSON T. WALTON, of Sutton, in the county of Clay and State of Nebraska, have invented certain new and useful Improvements in Cutting Apparatus for Mowing and Harvesting Machinery, of which the following is a full description, reference being had to the accompanying drawings.

My invention pertains to that form of cutting apparatus having guards into and through which moves a reciprocating knife having sections secured to a bar.

It consists first; in so shaping a part of the guard as to permit the knife or cutter bar to move in a race formed thereby, to prevent mud from coming in contact with the said cutter bar; in grooving the knife section and tonguing the front edge of the guards so as to enter the same to prevent, as much as possible, sand and shreds of grass from working backward into the space in which the cutter bar moves, and in providing a rearwardly directed opening between the several guards and beneath the finger bar to permit such shreds of grass and sand to move downward, backward and out.

I am aware it is not new to provide a mud-proof slot in which the cutter bar may move, but I believe it to be new to provide a space such as shown and described, having downwardly and backwardly directed openings out through which any shreds of grass and sand may pass.

Figure 1:
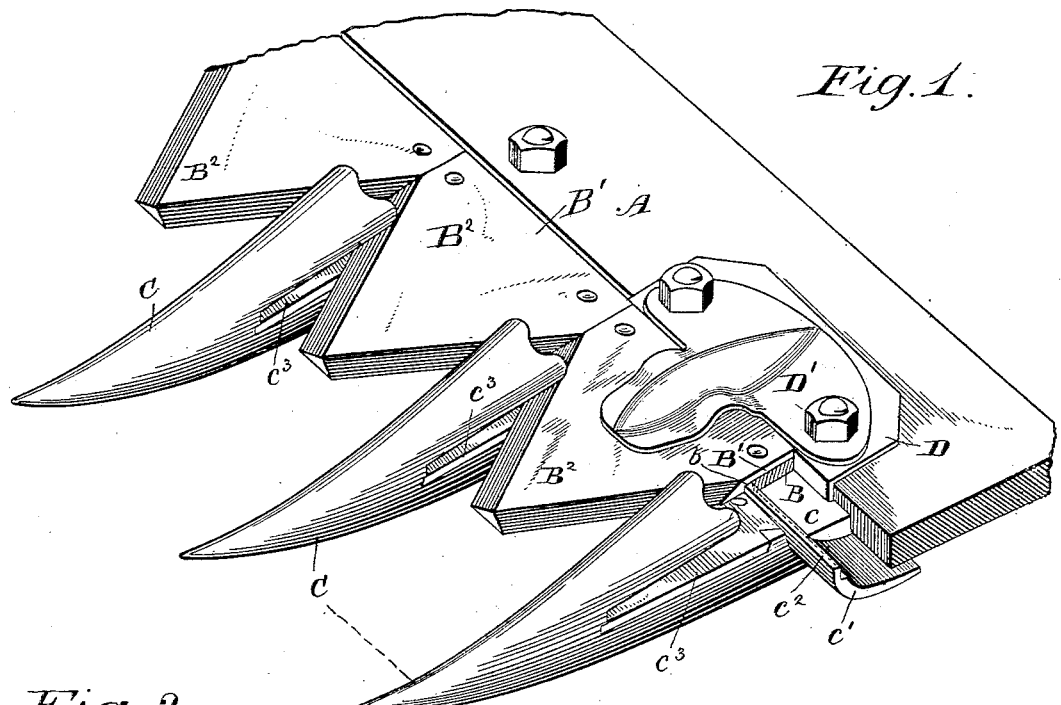
Figure 2:
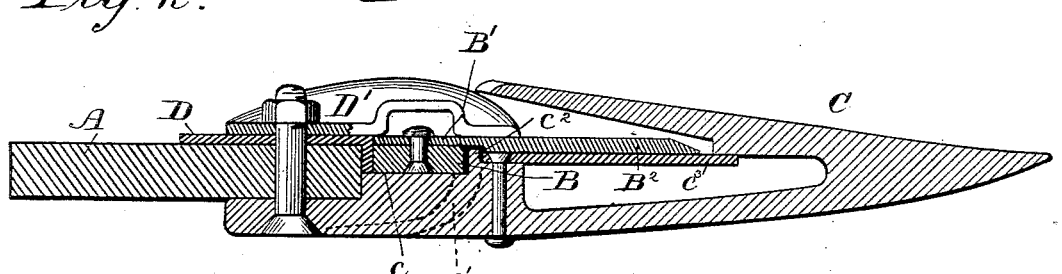
Figures 3, 4:
Figure 5:
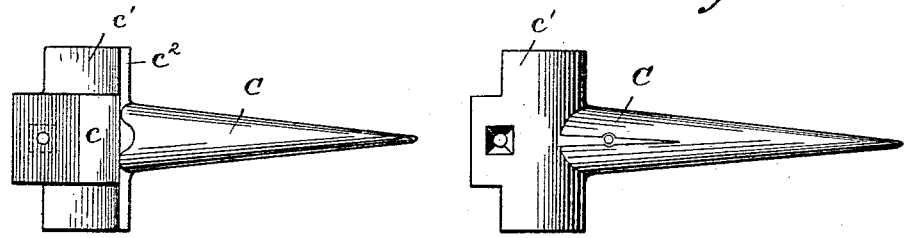

In the drawings, Figure 1 is a perspective view of an ordinary cutting apparatus of a mowing machine with my improvement added. Fig. 2 is a side sectional view of the same. Fig. 3 is a top view of one of my guards, and Fig. 4 a bottom view of the same. Fig. 5 is a bottom view of the knife sections.

A is a finger bar. B the cutter bar. B' are knives secured to the said bar by rivets or otherwise.

C are the guards having the usual ledger plates $c^3$. These guards are secured to the finger bar by means of bolts in the usual manner.

D is a wearing plate, best shown in Fig. 2, against which the cutter bar and the rear edge of the sections B' move.

D' is a clip held in place by the guard bolts and adapted to reach forward and hold the cutting sections in proper relation to the ledger plates of the guards.

As far as described I have made no departure from well known forms. It will be seen, however, that I extend, on each side of the guard, a wing $c^2$, the length of which is equal to the distance between the guards. When placed upon the bar these wings abut against each other and hold the guards from swinging sidewise. The guards are shouldered against the finger beam, but the wing is a common expedient for aiding the said shoulder. I have extended the wings, however, downwardly and rearwardly so that when placed upon the bar they form a continuous race in which the cutter bar may move. These wings prevent the latter from coming in contact with any mud and thus prevent accumulations of the same from obstructing the free movement of the knife. It has been found wherever a closed race has been used that sand would work therein and remain, and the space finally become filled. It has also been found that shreds of grass will work backward into such a space and eventually become an obstruction to the free movement of the knife. To avoid this I extend the wings so far below the edge of the cutter bar as to leave a downwardly and backwardly directed space large enough to permit a free exit of such substances. Directing this opening backward there is no tendency for mud to work upwardly into it. In order, as much as possible, to prevent sand and shreds of grass from working into the cutter bar race thus provided under the sections, I groove the under side of the latter just in advance of the forward edge of the cutter bar and upon the upper edge of the guards, and immediately below the groove form the tongue $c^2$ and permit the tongue to enter the groove.

This cutting apparatus, although shown as adapted only to that of a mower, may be advantageously used upon cutting apparatus for grain cutting machines. It is quite true that a tongue may be formed on the sections and a groove in the guards and serve the same purpose of preventing shreds of grass and sand from working into the cutter bar race, but the form shown is preferable. In order to form the groove in the sections in the easiest manner I thin the rear portion, as shown in Fig. 3 and leave the shoulder between said portion and the thicker portion in front so that when riveted to the cutter bar a groove is formed between said bar and the thickened portion of the sections.

What I claim as my invention, and desire to secure by Letters Patent, is—

1. A guard or series of guards having laterally extended wings that form the front and bottom of a cutter bar race and leave a rearward opening, between the said guards substantially as described.

2. The combination of the cutter bar with the finger bar and with guards having lateral extensions that form a race in which the said cutter bar may move, said space having openings between the said guards in a rearward direction, beneath the said finger bar, substantially as described.

3. The combination of a finger bar, guards, cutter bar and sections, the said sections and said guards tongued and grooved, substantially as described.

4. In a cutting apparatus a knife consisting of sections secured to a knife-back, the rear part of said sections made thinner than the front parts of said sections and thus when secured to said knife-back adapted to form a groove in combination with a guard having a tongue entering the same, substantially as described.

PIERSON T. WALTON.

Witnesses:
SIDNEY L. SAMUELS,
BENJAMIN M. TERRELL.